_US005693765A_

United States Patent [19]

Doswald

[11] Patent Number: 5,693,765
[45] Date of Patent: Dec. 2, 1997

[54] SUBSTITUTED 5-[5'-[(5"- CHLORO-2", 4"-DIFLUOROPYRIMID-6"-YLAMINO) PHENYLCARBONYLAMINO]-2'-SULFOPHENYL-AZO]-6-HYDROXY-4-METHYL-3-SULFOMETHYLPYRID-2-ONES

[75] Inventor: Paul Doswald, Münchenstein, Switzerland

[73] Assignee: Clariant Finance (BVI) Limited, Tortola, Virgin Islands (Br.)

[21] Appl. No.: 471,814

[22] Filed: Jun. 6, 1995

Related U.S. Application Data

[63] Continuation of Ser. No. 612,635, Nov. 13, 1990, abandoned.

[30] Foreign Application Priority Data

Nov. 13, 1989 [DE] Germany .......................... 39 37 681.8

[51] Int. Cl.[6] ...................... C09B 62/24; C09B 62/245; D06P 1/382
[52] U.S. Cl. ............................................. 534/635; 534/638
[58] Field of Search ........................................... 534/635

[56] References Cited

U.S. PATENT DOCUMENTS

| 4,039,523 | 8/1977 | Hegar | 534/635 |
| 5,386,015 | 1/1995 | Doswald et al. | 534/637 |

FOREIGN PATENT DOCUMENTS

| 272532 | 6/1988 | European Pat. Off. . |
| 2009213 | 6/1979 | United Kingdom . |

*Primary Examiner*—Floyd D. Higel
*Attorney, Agent, or Firm*—Carl W. Battle; Thomas C. Doyle

[57] ABSTRACT

Compounds of the formula

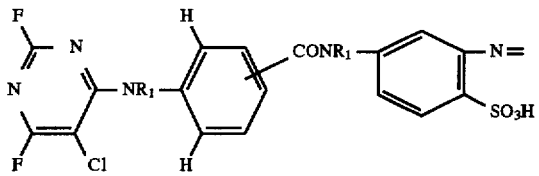

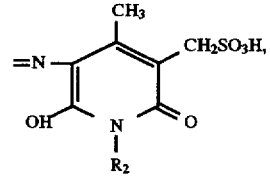

and salts thereof,
wherein each
$R_1$ is independently hydrogen or $C_{1-4}$alkyl, and
$R_2$ is hydrogen; $C_{1-6}$alkyl; $C_{2-4}$alkenyl; $C_{2-4}$alkynyl; cyclohexyl; phenyl; phenyl substituted by 1 to 3 substituents selected from halo, $C_{1-4}$alkyl, $C_{1-4}$alkoxy, —$SO_3H$ and —COOH; phenyl ($C_{1-4}$alkyl); phenyl($C_{1-4}$alkyl) the phenyl ring of which is substituted by 1 to 3 substituents selected from halo, $C_{1-4}$alkyl, $C_{1-4}$alkoxy, —$SO_3H$ and —COOH; or —W—Y,
wherein
W is linear or branched $C_{1-6}$alkylene, and
Y is —COOH, —COO$C_{1-4}$alkyl, —$SO_3H$, —$OSO_3H$, hydroxy, cyano, $C_{1-4}$alkoxy, —$NH_2$, a protonatable aliphatic, cycloaliphatic, aromatic or heterocyclic amino group or a quaternary ammonium group,
or a mixture of such compounds or salts, useful for dyeing or printing hydroxy group- or nitrogen-containing organic substrates, for example leather and fibre material comprising natural or synthetic polyamides or natural or regenerated cellulose, especially textile materials comprising cotton. The obtained dyeings and prints show good general fastness properties such as good light fastness, wet fastnesses and resistance to oxidative influences.

34 Claims, No Drawings

SUBSTITUTED 5-[5'-[(5"- CHLORO-2", 4"- DIFLUOROPYRIMID-6"-YLAMINO) PHENYLCARBONYLAMINO]-2'- SULFOPHENYL-AZO]-6-HYDROXY-4-METHYL-3-SULFOMETHYLPYRID-2-ONES

This is a continuation of application Ser. No. 07/612,635 filed Nov. 13, 1990, and now abandoned.

This invention relates to fibre-reactive monoazo compounds and a process for their preparation. These compounds are suitable for use as fibre-reactive dyestuffs in conventional dyeing and printing processes.

More particularly, the invention provides compounds of formula I

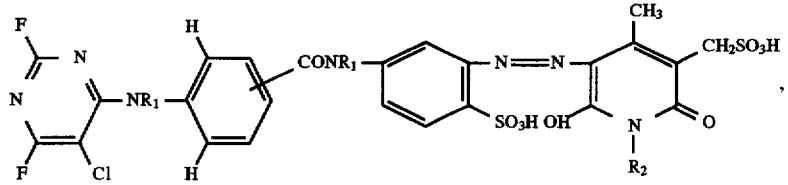

(I)

and salts thereof, in which each

R$_1$ is independently hydrogen or C$_{1-4}$alkyl, and

R$_2$ is hydrogen, C$_{1-6}$alkyl, C$_{2-4}$alkenyl, C$_{2-4}$alkynyl, cyclohexyl, phenyl or phenyl(C$_{1-4}$alkyl) in which each phenyl ring is unsubstituted or substituted by 1 to 3 substituents selected from halogen, C$_{1-4}$alkyl, C$_{1-4}$alkoxy, —SO$_3$H and —COOH, or C$_{1-6}$alkylene-Y, in which Y is —COOH, —COOC$_{1-4}$alkyl, —SO$_3$H, —OSO$_3$H, —OH, —CN, C$_{1-4}$alkoxy, —NH$_2$ or a protonatable aliphatic, cycloaliphatic, aromatic or heterocyclic amino group or a quaternary ammonium group, and a mixture of compounds of formula I.

In the specification, any alkyl, alkenyl, alkynyl or alkylene group present is linear or branched unless indicated otherwise.

In any hydroxy- or alkoxy-substituted alkyl or alkylene group which is attached to a nitrogen atom, the hydroxy group is preferably bound to a carbon atom which is not directly attached to this nitrogen atom.

Any halogen is preferably fluorine, chlorine or bromine; more preferably, it is chlorine or bromine, especially chlorine.

stituted or substituted by 1 to 3 methyl groups, phenyl or phenyl(C$_{1-4}$alkyl) in which each phenyl ring is unsubstituted or substituted by one or two substituents selected from halogen, preferably chlorine, C$_{1-4}$alkyl, C$_{1-4}$alkoxy, —SO$_3$H and —COOH, or —NR$_3$R$_4$ is a piperidine, morpholine or piperazine ring which latter ring is unsubstituted or substituted by up to three methyl groups, each of R$_5$ and R$_6$ independently has one of the significances of R$_3$ and R$_4$, but independent of R$_3$ and R$_4$, except hydrogen, and R$_7$ is C$_{1-4}$alkyl or benzyl, or —$_{\oplus}$NR$_5$R$_6$R$_7$ is a pyridinium radical which is unsubstituted or substituted by one or two methyl groups, and An$^{\ominus}$ is a non-chromophoric anion.

More preferably, Y is Y$_b$ where Y$_b$ is —COOH, —S$_3$H, —OSO$_3$H, —OH or —NR$_{3a}$R$_{4a}$, in which each of R$_{3a}$ and R$_{4a}$ is independently hydrogen, methyl, ethyl, 2-hydroxyethyl or phenyl(C$_{1-2}$alkyl), or —NR$_{3a}$R$_{4a}$ is a piperidine, morpholine or piperazine ring. Most preferably, Y is Y$_c$ where Y$_c$ is —OH, —SO$_3$H or —NR$_{3b}$R$_{4b}$, in which each R$_{3b}$ and R$_{4b}$ is independently hydrogen, methyl or ethyl.

Any anion An$^{\ominus}$ is preferably a chloride or acetate ion.

R$_2$ is preferably R$_{2a}$, where R$_{2a}$ is hydrogen, methyl, ethyl, cyclohexyl, phenyl or phenyl(C$_{1-2}$alkyl) in which each phenyl ring is unsubstituted or substituted by one or two substituents selected from chlorine, methyl, methoxy, —SO$_3$H and —COOH, or —C$_{1-4}$alkylene-Y$_a$. More preferably R$_2$ is R$_{2b}$, where R$_{2b}$ is hydrogen, methyl, ethyl, cyclohexyl, phenyl(C$_{1-2}$alkyl) or —C$_{1-3}$alkylene-Y$_b$. Most preferably R$_2$ is R$_{2c}$, where R$_{2c}$ is hydrogen, methyl, ethyl or —(CH$_2$)$_n$—Y$_c$, in which n is 2 or 3.

Preferred compounds of formula I correspond to formula Ia

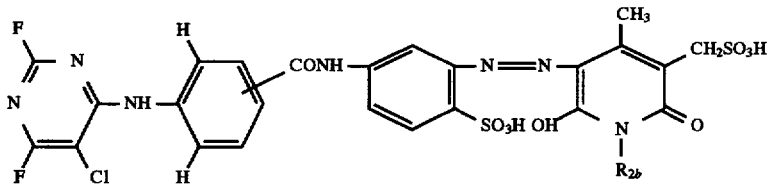

Ia and salts thereof, in which R$_{2b}$ is as defined above.

More preferred are compounds of formula Ia in which R$_{2b}$ is R$_{2c}$ as defined above.

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., Preferably, each R$_1$ is independently hydrogen or methyl, most preferably each R$_1$ is hydrogen.

Y is preferably Y$_a$, where Y$_a$ is —COOH, —S$_3$H, —OSO$_3$H, —OH, —CN, methoxy, —NR$_3$R$_4$ or —$_{\oplus}$NR$_5$R$_6$R$_7$ An$^{\ominus}$, in which each of R$_3$ and R$_4$ is independently hydrogen, unsubstituted C$_{1-4}$alkyl or C$_{1-4}$alkyl which is monosubstituted by hydroxy, C$_{1-4}$alkoxy, —COOH, —SO$_3$H, —NHC$_{1-4}$ alkyl or —N(C$_{1-4}$alkyl)$_2$, cyclohexyl which is unsublithium, sodium, potassium, ammonium, mono-, di-, tri- and tetra-methylammonium, tri-ethylammonium and mono-, di- and tri-ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in mixed salt form.

The present invention further provides a process for the preparation of compounds of formula I and mixtures thereof comprising reacting the diazonium salt of an amine of formula II

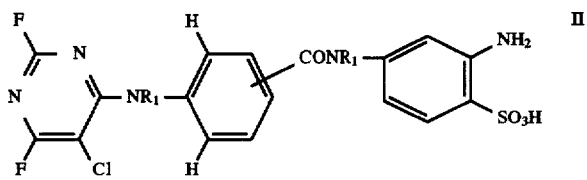

in which $R_1$ is as defined above, or a mixture thereof with a compound of formula III

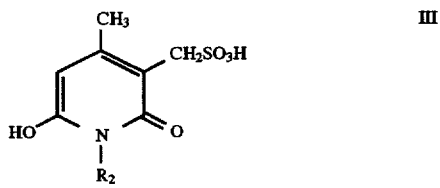

in which $R_2$ is as defined above, or a mixture thereof.

Coupling of the diazonium salt of an amine of formula II with a compound of formula III is suitably effected in an aqueous reaction medium, preferably at pH of about 7.

The compounds of formula II may be prepared by reacting a compound of formula IV

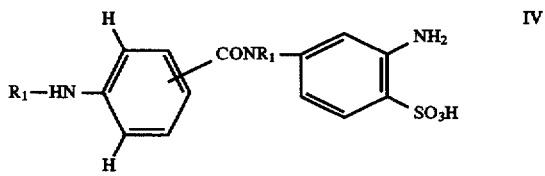

in which $R_1$ is as defined above, with 5-chloro-2,4,6-trifluoropyrimidine.

The condensation of a compound of formula IV containing a primary or secondary amino group with 5-chloro-2,4,6-trifluoropyrimidine is preferably carried out at a temperature of from 0°–20° C. and at pH 3.0–8.0, more preferably at pH 4.5–6.0.

The starting compounds of formulae III and IV are either known or may be prepared in accordance with known methods using known starting material.

The compounds of formula I may be isolated in accordance with known methods, for example, by conventional salting out with alkali metal salt, filtering and drying optionally in vacuo and at slightly elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

The compounds of formula I and mixtures thereof are useful as fibre-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fibre-reactive dyestuff field. Preferably, for the compounds of formula I the exhaust dyeing method is used at temperatures within the range of 30° to 60° C.

The compounds of this invention are well compatible with other fibre-reactive dyes; they may be applied per se or in combination with appropriate fibre-reactive dyestuffs of the same class having analogous dyeing properties, e.g., concerning common fastness properties and the extent of ability to exhaust from the dyebath onto the fibre. The dyeings obtained with such combination mixtures have good fastness properties and are comparable to those obtained with a single dye-stuff.

The compounds of formula I are well soluble in electrolyte-containing dye baths. In view of their good build-up power the compounds of formula I give good exhaust and fixation yields. Any unfixed dye-stuff can be easily washed off the substrate. The dyeings and prints obtained show good dry and wet light fastness and also good wet fastness properties such as wash, water, sea water and sweat fastness. They are resistant to oxidative influences, e.g., chlorinated water, hypochlorite bleach and peroxide- or perborate-containing wash liquors. Furthermore, the dyeings and prints obtained with the compounds of formula I show notably high stability to acid hydrolysis, for example, a dyeing when contacted with dilute acetic acid, only shows a slight staining of the undyed accompanying fabric.

The following examples further serve to illustrate the invention. In the examples all parts and percentages are by weight unless otherwise stated. The temperatures are in degrees Centigrade.

EXAMPLE 1

68.4 Parts of 3-amino-4'-(5"-chloro-2", 6"-difluoropyrimidinylamino)-1-benzoylaminobenzene-4-sulphonic acid are stirred into 600 parts of water. To this mixture 38 parts of an aqueous 4N sodium nitrite solution are added. The resultant suspension is added dropwise at 0°–5° to a mixture of 300 parts of ice and 45 parts of 30% hydrochloric acid within 30 minutes. The reaction mixture is then stirred at 0°–5° for one hour, and any excess nitrite is decomposed with a small amount of sulphamic acid. Subsequently, 44.5 parts of 1-ethyl-6-hydroxy-4-methyl-3-sulphomethylpyridone(2) which have been dissolved in 500 parts of water, are added thereto. The pH of the reaction mixture is adjusted to 7.0 by the addition of 320 parts of 20% sodium carbonate solution. The resultant dyestuff is precipitated from the yellow supension by adding 450 parts of sodium chloride, it is then filtered and dried. The dyestuff thus obtained has the formula

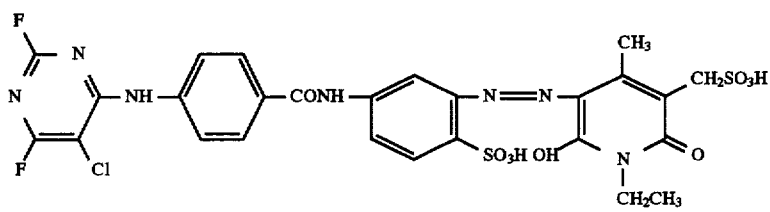

it dyes cotton a brilliant greenish yellow shade. The dyeings and prints on cotton obtained in accordance with conventional methods show good light and wet fastness properties, and furthermore, they are resistant to oxidative influences and to acid hydrolysis.

EXAMPLES 2–13

By analogy with the method described in Example 1 using appropriate starting compounds, further compounds of formula I may be prepared. They correspond to formula A

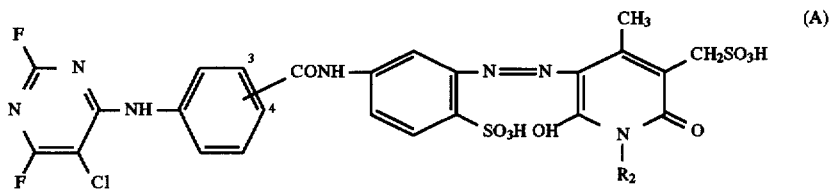

in which the symbols are as defined in the following Table.

The compounds of Examples 2 to 13 may be applied to substrates comprising cellulose fibres, and particularly to textile material comprising cotton, according to the conventional exhaust dyeing method or to conventional printing processes, where dyeings and prints of a greenish yellow shade are obtained. These dyeings and prints on cotton show good light and wet fastness properties and are resistant to oxidative influences.

TABLE

Compounds of formula A

| Ex. No. | position of —CONH— | $R_2$ |
|---|---|---|
| 2 | 3 | —$CH_2CH_3$ |
| 3 | 4 | —$CH_3$ |
| 4 | 3 | " |
| 5 | 4 | H |
| 6 | 3 | H |
| 7 | 4 | —$CH_2CH_2SO_3H$ |
| 8 | 4 | —$(CH_2)_3NHCH_3$ |
| 9 | 3 | —$(CH_2)_3NHC_2H_5$ |
| 10 | 4 | —$(CH_2)_3N(C_2H_5)_2$ |
| 11 | 3 | —$(CH_2)_2N(CH_3)_2$ |
| 12 | 4 | —$CH_2CH_2OH$ |
| 13 | 4 | —$(CH_2)_2NHC_2H_5$ |

In accordance with the preparation method as described in Example 1 the compounds of Examples 1 to 13 are obtained in sodium salt form. They may, depending on the reaction/isolation conditions or by reacting the sodium salts in accordance with known methods, also be obtained in free acid form or in other salt forms, for example those salt forms containing one or more cations indicated in the description above.

In the following examples the application of the compounds of this invention is illustrated.

Application Example A 0.3 Part of the dyestuff of Example 1 is dissolved in 300 parts of demineralised water and 15 parts of Glauber's salt (calcined) are added. The dye bath is heated to 40°, then 10 parts of cotton fabric (bleached) are added. After 30 minutes at 40°, 6 parts of sodium carbonate (calcined) are added to the bath portionwise every 10 minutes applying quantities of 0.2, 0.6, 1.2 and finally 4.0 parts thereof. During the addition of sodium carbonate the temperature is kept at 40°. Subsequently, dyeing is effected for a further one hour at 40°.

The dyed fabric is then rinsed with running cold water for 3 minutes and afterwards with running hot water for a further 3 minutes. The dyeing is washed at the boil for 15 minutes in 500 parts of demineralised water in the presence of 0.25 parts of Marseilla soap. After being rinsed with running hot water (for 3 minutes) and centrifuged, the dyeing is dried in a cabinet dryer at about 70°. A greenish yellow cotton dyeing is obtained showing good light and wet fastness properties which is stable towards oxidative influences.

Application Example B

To a dye bath containing in 300 parts of demineralised water 10 parts of Glauber's salt (calcined), 10 parts of cotton fabric (bleached) are added. The bath is heated to 40° within 10 minutes, and 0.5 part of the dyestuff of Example 1 is added. After a further 30 minutes at 40° 3 parts of sodium carbonate (calcined) are added and dyeing is continued at 40° for a further 45 minutes.

The dyed fabric is rinsed with running cold and then hot water and washed at the boil according to the method given in Application Example A. After rinsing and drying a greenish yellow cotton dyeing is obtained which has the same good fastness properties as indicated in Application Example A.

Similarly, the dyestuffs of Examples 2–13 or mixtures of the exemplified dyestuffs may be employed to dye cotton in accordance with the method described in Application Example A or B. The cotton dyeings thus obtained are greenish yellow and show good fastness properties.

Application Example C

A printing paste consisting of 40 parts of the dyestuff of Example 1

100 parts of urea

What is claimed is:

1. A compound of the formula

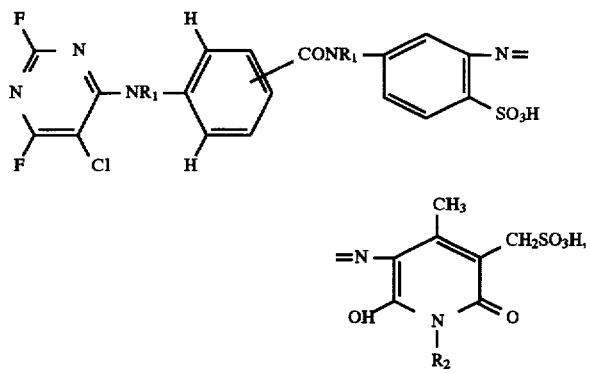

or a salt thereof,
wherein each $R_1$ is independently hydrogen or $C_{1-4}$alkyl, and $R_2$ is hydrogen; $C_{1-6}$alkyl; $C_{2-4}$alkenyl; $C_{2-4}$alkynyl; cyclohexyl; phenyl; phenyl substituted by 1 to 3 substituents selected from halo, $C_{1-4}$alkyl, $C_{1-4}$alkoxy, —$SO_3H$ and —COOH; phenyl ($C_{1-4}$alkyl); phenyl($C_{1-4}$alkyl) the phenyl ring of which is substituted by 1 to 3 substituents selected from halo, $C_{1-4}$alkyl, $C_{1-4}$alkoxy, —$SO_3H$ and —COOH; or —W—Y,
wherein
W is linear or branched $C_{1-6}$alkylene, and Y is —COOH, —COO$C_{1-4}$alkyl, —$SO_3H$, —$OSO_3H$, hydroxy, cyano, $C_{1-4}$alkoxy, —$NR_3R_4$ or —$_\oplus NR_5R_6R_7$ An$^\ominus$,
wherein each of
$R_3$ and $R_4$ is independently hydrogen; $C_{1-4}$-alkyl; $C_{1-4}$alkyl monosubstituted by hydroxy, $C_{1-4}$alkoxy, —COOH, —$SO_3H$, —NH$C_{1-4}$alkyl or —N($C_{1-4}$alkyl)$_2$; cyclohexyl; cyclohexyl substituted by 1 to 3 methyl groups; phenyl; phenyl substituted by 1 or 2 substituents selected from halo, $C_{1-4}$-alkyl, $C_{1-4}$alkoxy, —$SO_3H$ and —COOH; phenyl($C_{1-4}$-alkyl) or phenyl($C_{1-4}$-alkyl) the phenyl ring of which is substituted by 1 or 2 substituents selected from halo, $C_{1-4}$alkyl, $C_{1-4}$alkoxy, —$SO_3H$ and —COOH, or
—$NR_3R_4$ is piperidino, morpholino, piperazino or piperazino substituted by 1 to 3 methyl groups,
each of $R_5$ and $R_6$ is independently $C_{1-4}$alkyl; $C_{1-4}$-alkyl monosubstituted by hydroxy, $C_{1-4}$alkoxy, —COOH, —$SO_3H$, —NH$C_{1-4}$alkyl or —N($C_{1-4}$alkyl)$_2$; cyclohexyl; cyclohexyl substituted by 1 to 3 methyl groups; phenyl; phenyl substituted by 1 or 2 substituents selected from halo, $C_{1-4}$-alkyl, $C_{1-4}$alkoxy, —$SO_3H$ and —COOH; phenyl($C_{1-4}$-alkyl) or phenyl($C_{1-4}$alkyl) the phenyl ring of which is substituted by 1 or 2 substituents selected from halo, $C_{1-4}$-alkyl, $C_{1-4}$alkoxy, —$SO_3H$ and —COOH, and $R_7$ is $C_{1-4}$alkyl or benzyl, or —$_\oplus NR_5R_6R_7$ is pyridinium or pyridinium substituted 1 or 2 methyl groups, and An$^\ominus$ is a non-chromophoric anion, or a mixture of such compounds or salts.

2. A compound according to claim 1, or a water-soluble salt thereof each cation of which is independently a non-chromophoric cation,
or a mixture of such compounds or water-soluble salts.

3. A compound according to claim 2, or a water-soluble salt thereof each cation of which is independently a non-chromophoric cation.

4. A compound according to claim 3, or a water-soluble salt thereof each cation of which is independently a non-chromophoric cation,
wherein
each halo is independently fluoro, chloro or bromo, and
each hydroxy and alkoxy substituent on an alkyl or alkylene radical attached to a nitrogen atom is attached to a carbon atom not directly attached to the nitrogen atom.

5. A compound according to claim 4, or a water-soluble salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

6. A compound according to claim 5, or a water-soluble salt thereof each cation of which is independently lithium, sodium, potassium or ammonium.

7. A compound according to claim 6, or a water-soluble sodium salt thereof.

8. A compound according to claim 3, or a water-soluble salt thereof each cation of which is independently a non-chromophoric cation,
wherein
Y is —COOH, —$SO_3H$, —$OSO_3H$, hydroxy, cyano, methoxy, —$NR_3R_4$ or —$_\oplus NR_5R_6R_7$ An$^\ominus$,
wherein each of
$R_3$ and $R_4$ is independently hydrogen; $C_{1-4}$alkyl; $C_{1-4}$alkyl monosubstituted by hydroxy, $C_{1-4}$alkoxy, —COOH, —$SO_3H$, —NH$C_{1-4}$alkyl or —N($C_{1-4}$ alkyl)$_2$; cyclohexyl; cyclohexyl substituted by 1 to 3 methyl groups; phenyl; phenyl substituted by 1 or 2 substituents selected from halo, $C_{1-4}$alkyl, $C_{1-4}$alkoxy, —$SO_3H$ and —COOH; phenyl($C_{1-4}$-alkyl) or phenyl($C_{1-4}$-alkyl) the phenyl ring of which is substituted by 1 or 2 substituents selected from halo, $C_{1-4}$alkyl, $C_{1-4}$alkoxy, —$SO_3H$ and —COOH, or
—$NR_3R_4$ is piperidino, morpholino, piperazino or piperazino substituted by 1 to 3 methyl groups,
each of $R_5$ and $R_6$ is independently $C_{1-4}$alkyl; $C_{1-4}$alkyl monosubstituted by hydroxy, $C_{1-4}$alkoxy, —COOH, —$SO_3H$, —NH$C_{1-4}$alkyl or —N($C_{1-4}$alkyl)$_2$; cyclohexyl; cyclohexyl substituted by 1 to 3 methyl groups; phenyl; phenyl substituted by 1 or 2 substituents selected from halo, $C_{1-4}$alkyl, $C_{1-4}$alkoxy, —$SO_3H$ and —COOH; phenyl($C_{1-4}$alkyl) or phenyl ($C_{1-4}$alkyl) the phenyl ring of which is substituted by 1 or 2 substituents selected from halo, $C_{1-4}$alkyl, $C_{1-4}$alkoxy, —$SO_3H$ and —COOH, and $R_7$ is $C_{1-4}$alkyl or benzyl, or —$_⊕NR_5R_6R_7$ is pyridinium or pyridinium substituted by 1 or 2 methyl groups, and $An^⊖$ is a non-chromophoric anion.

9. A compound according to claim 8, or a water-soluble salt thereof each cation of which is independently a non-chromophoric cation, wherein each halo is independently fluoro, chloro or bromo, and each hydroxy and alkoxy substituent on an alkyl or alkylene radical attached to a nitrogen atom is attached to a carbon atom not directly attached to the nitrogen atom.

10. A compound according to claim 9, or a water-soluble salt thereof each cation of which is independently a non-chromophoric cation, wherein each $R_1$ is independently hydrogen or methyl.

11. A compound according to claim 8, or a water-soluble salt thereof each cation of which is independently a non-chromophoric cation,
wherein $R_2$ is hydrogen; methyl; ethyl; cyclohexyl; phenyl; phenyl substituted by 1 or 2 substituents selected from chloro, methyl, methoxy, —$SO_3H$ and —COOH; phenyl($C_{1-2}$-alkyl); phenyl($C_{1-2}$alkyl) the phenyl ring of which is substituted by 1 or 2 substituents selected from chloro, methyl, methoxy, —$SO_3H$ and —COOH; or —$W_a$—$Y_a$, $R_7$ is $C_{1-4}$alkyl or benzyl, or
—$_⊕NR_5R_6R_7$ is pyridinium or pyridinium substituted by 1 or 2 methyl groups, and
$An^⊖$ is a non-chromophoric anion.

12. A compound according to claim 11, or a water-soluble salt thereof each cation of which is independently a non-chromophoric cation,
wherein each halo is independently fluoro, chloro or bromo, and
each hydroxy and alkoxy substituent on an alkyl or alkylene radical attached to a nitrogen atom is attached to a carbon atom not directly attached to the nitrogen atom.

13. A compound according to claim 12, or a water-soluble salt thereof each cation of which is independently a non-chromophoric cation,
wherein each $R_1$ is independently hydrogen or methyl.

14. A compound according to claim 11, or a water-soluble salt thereof each cation of which is independently a non-chromophoric cation,
wherein each $R_1$ is independently hydrogen or methyl.

15. A compound according to claim 14, or a water-soluble salt thereof each cation of which is independently a non-chromophoric cation,
wherein each $R_1$ is hydrogen.

16. A compound according to claim 15 having the formula

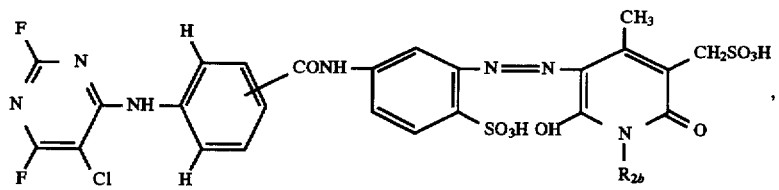

wherein
$W_a$ is linear or branched $C_{1-4}$alkylene, and $Y_a$ is —COOH, —$SO_3H$, —$OSO_3H$, hydroxy, cyano, methoxy, —$NR_3R_4$ or —$_⊕NR_5R_6R_7$ $An^⊖$,
wherein each of
$R_3$ and $R_4$ independently hydrogen, $C_{1-4}$alkyl or $C_{1-4}$-alkyl monosubstituted by hydroxy, $C_{1-4}$alkoxy, —COOH, —$SO_3H$, —$NHC_{1-4}$alkyl or —$N(C_{1-4}$alkyl$)_2$; cyclohexyl; cyclohexyl substituted by 1 to 3 methyl groups; phenyl; phenyl substituted by 1 or 2 substituents selected from halo $C_{1-4}$alkyl $C_{1-4}$alkoxy, —$SO_3H$ and —COOH; phenyl-($C_{1-4}$alkyl) or phenyl($C_{1-4}$-alkyl) the phenyl ring of which is substituted by 1 or 2 substituents selected from halo, $C_{1-4}$alkyl, $C_{1-4}$alkoxy, —$SO_3H$ and —COOH, or
—$NR_3R_4$ is piperidino, morpholino, piperazino or piperazino substituted by 1 to 3 methyl groups,
each of $R_5$ and $R_6$ is independently $C_{1-4}$alkyl or $C_{1-4}$alkyl monosubstituted by hydroxy, $C_{1-4}$alkoxy, —COOH, —$SO_3H$, —$NHC_{1-4}$alkyl or —$N(C_{1-4}$-alkyl$)_2$; cyclohexyl; cyclohexyl substituted by 1 to 3 methyl groups; phenyl; phenyl substituted by 1 or 2 substituents selected from halo, $C_{1-4}$alkyl, $C_{1-4}$alkoxy, —$SO_3H$ and —COOH; phenyl($C_{1-4}$alkyl) or phenyl($C_{1-4}$-alkyl) the phenyl ring of which is substituted by 1 or 2 substituents selected from halo, $C_{1-4}$alkyl, $C_{1-4}$alkoxy, —$SO_3H$ and —COOH, and or a water-soluble salt thereof each cation of which is independently a non-chromophoric cation,
wherein
$R_{2b}$ is hydrogen, methyl, ethyl, cyclohexyl, phenyl-($C_{1-2}$alkyl) or —$W_b$—$Y_b$,
wherein
$W_b$ is linear or branched $C_{1-3}$alkylene, and
$Y_b$ is —COOH, —$SO_3H$, —$OSO_3H$, hydroxy or —$R_{3a}R_{4a}$,
wherein each of
$R_{3a}$ and $R_{4a}$ is independently hydrogen, methyl, ethyl, 2-hydroxyethyl or phenyl($C_{1-2}$alkyl), or
—$NR_{3a}R_{4a}$ is piperidino, morpholino or piperazino.

17. A compound according to claim 16, or a water-soluble salt thereof each cation of which is independently a non-chromophoric cation,
wherein any hydroxy substituent on an alkylene radical attached to a nitrogen atom is attached to a carbon atom not directly attached to the nitrogen atom.

18. A compound according to claim 16, or a water-soluble salt thereof each cation of which is independently a non-chromophoric cation,
wherein $R_{2b}$ is hydrogen, methyl, ethyl or —$(CH_2)_n$—$Y_c$, wherein $Y_c$ is —OH, —$SO_3H$ or —$NR_{3b}R_{4b}$, wherein each of $R_{3b}$ and $R_{4b}$ is independently hydrogen, methyl or ethyl, and n is 2 or 3.

19. The compound according to claim 18 having the formula

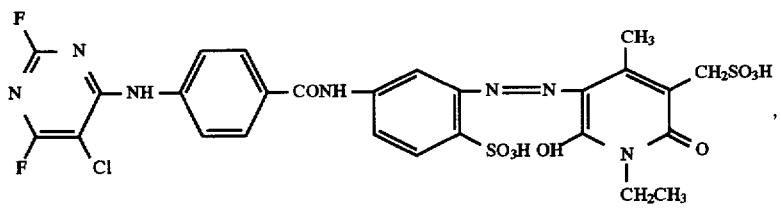

or a water-soluble salt thereof each cation of which is independently a non-chromophoric cation.

20. The compound according to claim 19 in sodium salt form.

21. The compound according to claim 18 having the formula

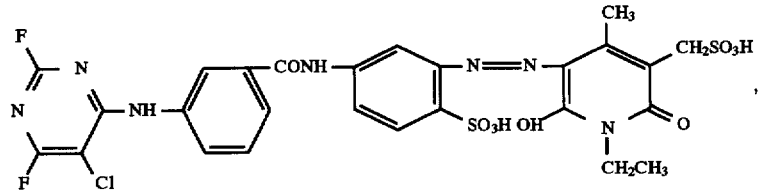

or a water-soluble salt thereof each cation of which is independently a non-chromophoric cation.

22. The compound according to claim 21 in sodium salt form.

23. The compound according to claim 18 having the formula

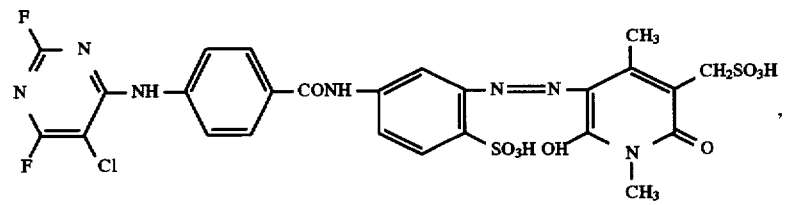

or a water-soluble salt thereof each cation of which is independently a non-chromophoric cation.

24. The compound according to claim 23 in sodium salt form.

25. The compound according to claim 18 having the formula

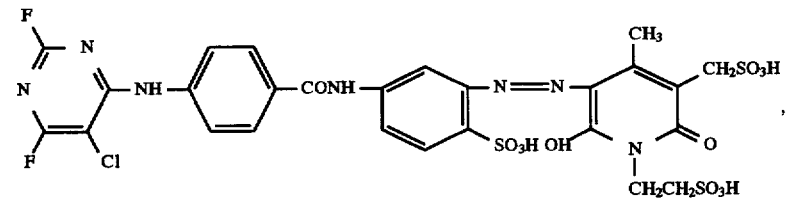

or a water-soluble salt thereof each cation of which is independently a non-chromophoric cation.

26. The compound according to claim 25 in sodium salt form.

27. A process for dyeing or printing an hydroxy group- or nitrogen-containing organic substrate comprising applying to an hydroxy group- or nitrogen-containing organic substrate a compound according to claim 2, a water-soluble salt thereof each cation of which is independently a non-chromophoric cation or a mixture of such compounds or water-soluble salts.

28. A process according to claim 27, wherein the substrate is a fiber material comprising natural or regenerated cellulose.

29. The compound according to claim 18 having the formula

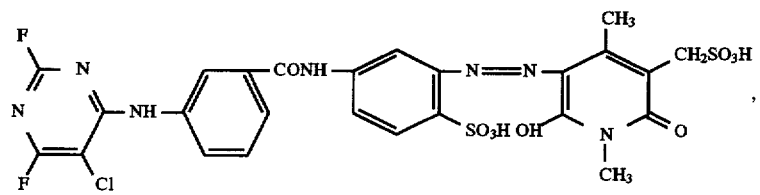

or a water-soluble salt thereof each cation of which is independently a non-chromophoric cation.

30. The compound of claim 29 in sodium salt form.

31. The compound according to claim 26 having the formula

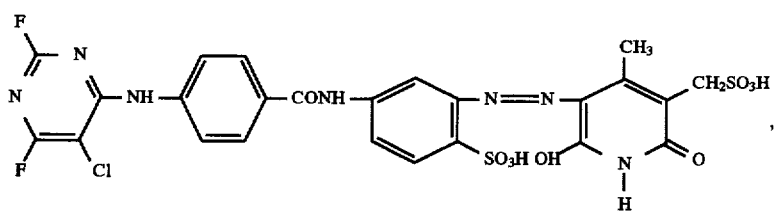

or a water-soluble salt thereof each cation of which is independently a non-chromophoric cation.

32. The compound of claim 31 in sodium salt form.

33. The compound according to claim 26 having the formula

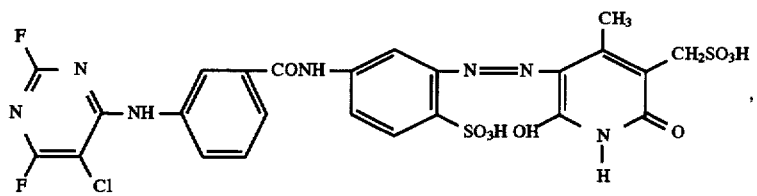

or a water-soluble salt thereof each cation of which is independently a non-chromophoric cation.

34. The compound of claim 33 in sodium salt form.

* * * * *